(12) United States Patent
Zhu et al.

(10) Patent No.: US 12,529,418 B1
(45) Date of Patent: Jan. 20, 2026

(54) TRANSMISSION DEVICE WITH CLUTCH AND DIFFERENTIAL FUNCTIONS

(71) Applicant: Changzhou Wujin Jincheng Gear Co., Ltd., Changzhou (CN)

(72) Inventors: Dang Zhu, Changzhou (CN); Hongwei Yang, Changzhou (CN)

(73) Assignee: CHANGZHOU WUJIN JINCHENG GEAR CO., LTD., Changzhou (CN)

(*) Notice: Subject to any disclaimer, the term of this patent is extended or adjusted under 35 U.S.C. 154(b) by 0 days.

(21) Appl. No.: 19/032,472

(22) Filed: Jan. 21, 2025

Related U.S. Application Data (63) Continuation of application No. PCT/CN2024/107468, filed on Jul. 25, 2024.

(30) Foreign Application Priority Data

Jul. 16, 2024 (CN) .......................... 202410948951.5

(51) Int. Cl.
  *F16H 48/16* (2006.01)
  *B60K 1/00* (2006.01)
  *F16H 37/08* (2006.01)

(52) U.S. Cl.
  CPC ........ *F16H 48/16* (2013.01); *B60K 2001/001* (2013.01); *F16H 37/08* (2013.01)

(58) Field of Classification Search
  CPC ............ A01D 34/6806; A01D 34/6812; A01D 69/06; A01D 69/08; F16H 48/10–11; F16H 48/16; F16H 2048/202; F16H 37/08–0826; B60K 2001/001
  See application file for complete search history.

(56) References Cited

U.S. PATENT DOCUMENTS

| | | | | |
|---|---|---|---|---|
| 1,465,469 A | * | 8/1923 | Flynn | F16D 41/00 74/650 |
| 1,466,214 A | * | 8/1923 | Thompson | F16D 41/16 192/50 |

(Continued)

FOREIGN PATENT DOCUMENTS

CN 116420511 A 7/2023

OTHER PUBLICATIONS

Written Opinion, International Appl. No. PCT/CN2024/107468, Oct. 21, 2024, issued by the China National Intellectual Property Administration (ISA/CN), Beijing, China.

*Primary Examiner* — James J Taylor, II
(74) *Attorney, Agent, or Firm* — Central California IP Group, P.C.; Andrew D. Fortney (57) ABSTRACT

A transmission device with clutch and differential functions, including a box-body part, is disclosed. The box-body part includes a clutch for use with an output shaft or shaft segments. The clutch is configured to drive the output shaft or shaft segments in the box-body part to rotate synchronously in one direction in the box-body part with the output shaft or shaft segments as axes. The clutch can be activated in the closed box-body part. In the closed box-body part, the clutch can be activated so that the output shaft or shaft segments freely switch between synchronous rotation in one direction and free rotation. The transmission device can automatically switch work modes, can realize a differential turning function, has a simple and compact structure, and can operate smoothly in each operating mode.

16 Claims, 7 Drawing Sheets

(56) References Cited

U.S. PATENT DOCUMENTS

| | | | | |
|---|---|---|---|---|
| 3,494,226 | A | * | 2/1970 | Biddle ................... F16H 48/16 |
| | | | | 475/249 |
| 11,364,797 | B1 | * | 6/2022 | Hayes ..................... F16H 48/06 |
| 11,897,328 | B2 | * | 2/2024 | Okuda ................ B60K 17/105 |
| 12,352,324 | B2 | * | 7/2025 | Puls ................... A01D 34/6812 |
| 2023/0217860 | A1 | | 7/2023 | Chen |
| 2024/0183410 | A1 | * | 6/2024 | Chen ...................... F16D 41/12 |

* cited by examiner

TRANSMISSION DEVICE WITH CLUTCH AND DIFFERENTIAL FUNCTIONS

RELATED APPLICATION(S)

This application is a continuation of International Pat. Appl. No. PCT/CN2024/107468, filed on Jul. 25, 2024, pending, which claims the benefit of Chinese Pat. Appl. No. 2024109489515, filed on Jul. 16, 2024 in the National Intellectual Property Administration, PRC (CNIPA), both of which are incorporated herein by reference.

TECHNICAL FIELD

The present invention relates to the technical field of transmission apparatuses, and in particular to a transmission device with clutch and differential functions.

BACKGROUND

A lawn mower includes a mowing cutter, an engine, a travel mechanism, a handle, and a control part, and can be classified into a hand-push lawn mower or a self-propelled lawn mower. The travel mechanism of the lawn mower includes a wheel axle on which a roller is mounted. The hand-push lawn mower is pushed manually so that the roller rotates and the lawn mower travels. The self-propelled lawn mower has an automatic travel mode and can automatically travel. The roller is driven by a motor or the engine to rotate and travel. A part on the lawn mower that can realize the automatic travel of the lawn mower is also known as a self-propelled machine of the lawn mower.

When the lawn mower operates, there are some places where the lawn mower can travel automatically and some places where the lawn mower needs to be pushed manually. Therefore, it is necessary to use a clutch. An automatic clutch can adaptively engage and disengage with a change of the motor's work state, without the need to manually operate the clutch. Therefore, the self-propelled machine of the lawn mower can realize automatic switching of work modes. The work modes include the automatic travel mode and the manual push mode.

Further, the lawn mower needs to turn during automatic travel. While turning, there is a speed difference between rotary shafts in the lawn mower on the inside and the outside of the turning direction. Therefore, a differential machine may be needed. The lawn mower also can be flexibly turned in the process of the automatic travel.

If the self-propelled machine of the lawn mower is flexibly turned and simultaneously needs to automatically switch work modes, the differential machine and an automatic clutch should be in the self-propelled machine at the same time. How to integrate the differential machine and the automatic clutch in the self-propelled machine so that the self-propelled machine has functions of flexible turning and automatic completion of the switching of the work modes, while keeping the self-propelled machine compact in structure and operating stably and smoothly in each work mode, is a problem that needs to be solved urgently.

SUMMARY

To solve the above defects, the present invention provides a transmission device with clutch and differential functions.

To overcome the defects in the background, the technical solution(s) adopted by the present invention to solve the technical problems are as follows: A transmission device with clutch and differential functions includes a box-body part. The box-body part includes at least two box-body sub-parts, which may be together and enclosed in the box-body part, at least one inserting hole in and/or exposing an interior of the box-body part, and an output shaft. The output shaft is partially in the box-body part and passes through the inserting hole(s) in the box-body part. The output shaft is configured to rotate (e.g., inside the box-body part). The output shaft extends at least partially outside the box-body part (e.g., while inserted in the closed box-body part). The output shaft may include a single piece or at least two output shaft segments (e.g., A, B). The box-body part further includes a clutch unit (e.g., for use with the output shaft or the output shaft segments). The clutch unit is configured to drive and/or synchronously rotate the output shaft or the output shaft segments in the box-body part (e.g., when inserted in the closed box-body part) in one direction in the box-body part, with the output shaft or the output shaft segments as axes (e.g., of rotation). In the closed box-body part, the clutch unit is capable of being activated so that the output shaft or the output shaft segments freely switch between a state of synchronous rotation in one direction and a state in which the output shaft or the output shaft segments freely rotate.

The clutch unit is configured to drive the output shaft or the output shaft segments to perform a simple angular displacement within the box-body part (e.g., with the output shaft or the output shaft segments as the axes in one direction or in an opposite direction of synchronous rotation in the closed box-body part, through the output shaft or the output shaft segments), with the clutch unit positioned by the output shaft or the output shaft segments in the box-body part, so that the clutch unit drives the output shaft or the output shaft segments and can switch from the state of synchronous rotation in the one direction to the state in which the output shaft or the output shaft segments freely rotate.

After driving the output shaft or the output shaft segments A, B to perform the simple angular displacement in the direction of synchronous rotation, the clutch unit may switch from the state in which the output shaft or the output shaft segments freely rotate to a state in which the clutch unit drives the output shaft or the output shaft segments to rotate synchronously in one direction.

As a further improvement, the transmission device includes the at least one clutch unit on the output shaft.

As a further improvement, the clutch unit includes a rotary drive part for transmitting power, a rotary driven part coaxially and rotationally connected to the rotary drive part, and a non-locking rotary limiting unit for limiting the rotation of the rotary driven part. The output shaft or the output shaft segments pass through rotary drive part, the rotary driven part, and the limiting unit axially. The rotary drive part and the rotary driven part may be rotationally disposed on (e.g., in contact with and allowing the rotation of) the output shaft or the output shaft segments. The rotary driven part is connected to at least one connecting shaft parallel to the output shaft or the output shaft segments. The connecting shaft is rotationally connected to a locking part through an arc segment hole (e.g., A) on or in the rotary drive part so that the rotary drive part drives the locking part (e.g., to perform a simple angular displacement). After the locking part performs the simple angular displacement, for example, the locking part is configured to engage with a rotary part connected to the output shaft or the output shaft segments so that the output shaft or the output shaft segments rotate synchronously with the rotary drive part. The output shaft or the output shaft segments may perform a simple angular displacement (e.g., be angularly displaced) in an opposite direction of the synchronous rotation (e.g., with the rotary drive part rotating in the direction of the synchronous rotation), so that the rotary part disengages from the locking part. As a result, the output shaft or the output shaft segments can rotate freely. The box-body part may limit rotation of the limiting unit (e.g., with the output shaft or the output shaft segments as the axes).

As a further improvement, the limiting unit is preferably a two-jawed clip or a multi-jawed clip.

As a further improvement, the rotary drive part includes a toothed ring with a closed end and internal and external teeth, and a raised part. The raised part is coaxially connected to the closed end of the toothed ring. The arc segment hole is in the closed end of the toothed ring. The rotary driven part may be rotationally and coaxially disposed on (e.g., coaxial with) the raised part. The toothed ring is configured to accommodate the rotary part and the locking part. The inner teeth of the toothed ring are configured to drive the locking part to perform the simple angular displacement so that the locking part disengages from or engages with the rotary part.

As a further improvement, the locking part includes a column body rotationally connected to the connecting shaft. A toothed area configured to mesh with the internal teeth of the toothed ring B and a locking tooth configured to engage with or disengage from the rotary part on the column body. The toothed ring drives the locking part to perform the simple angular displacement during rotation, so that the locking tooth engages with or disengages from the rotary part.

As a further improvement, the rotary part includes a connecting column connected to the output shaft or the output shaft segments and at least one locking protrusion. The at least one locking protrusion is disposed on the connecting column (e.g., in a circumferential direction). The locking protrusion is in contact with the locking tooth to limit the connecting column so that the output shaft or the output shaft segments rotate synchronously with the rotary drive part.

As a further improvement, the rotary parts on the output shaft segments may be rotationally connected to each other with a butting pin. The output shaft segments may be in a same straight line.

As a further improvement, the box-body part further includes a motor in and supported by the box-body part and a transmission unit in the box-body part. An output terminal of the motor may be connected to the clutch via a transmission mechanism to provide power to the clutch (e.g., on or to the output shaft or the output shaft segments).

As a further improvement, the transmission unit includes an active rotary gear connected to the output terminal of the motor, a first driven transmission part, and at least one second driven transmission part. The first driven transmission part and the second driven transmission part(s) may be rotationally disposed in the box-body part. The second driven transmission part(s) may mesh with the first driven transmission part. The active rotary gear meshes with the first driven transmission part. The second driven transmission part(s) may mesh with the clutch unit (e.g., on the output shaft or on the output shaft segments).

As a further improvement, the first driven transmission part includes an inner gear ring with a closed structure at one end and a first connecting gear coaxially connected to the inner gear ring. The second driven transmission part(s) include a toothed column and a second connecting gear coaxially connected to the toothed column. Inner teeth of the inner gear ring mesh with the active rotary gear. The first connecting gear meshes with the second connecting gear. The toothed column meshes with the clutch.

The present invention has the following beneficial effects. This design adopts a clutch that is connected to the output shaft to realize differential and clutch functions, switches work modes in different operational states of the motor, and allows the lawn mower to be flexibly turned during operation. This design has a simple and compact structure, and operates smoothly in various work modes. The clutch with a special structure is configured to integrate the clutch and differential machine together. The locking part disengages from or engages with the rotary part to realize the integrated clutch and differential functions.

BRIEF DESCRIPTION OF THE DRAWINGS

The present invention is further described below in connection with the accompanying drawings and embodiments.

In the figures: 1—Box-body part, 1A, 1B—Box-body sub-parts, 2—Output shaft, 2A, 2B—Output shaft segments, 3—Clutch unit 3, 4—Driven transmission part I, 4A—Toothed column, 4B—Connecting gear I, 5—Driven transmission part II, 5A—Internal toothed ring, 5B—Connecting gear II, 6—Active rotary gear, 7—Motor, 8—Limiting unit, 9—Rotary drive part, 9A—Arc segment hole, 9B—Toothed ring, 9C—Raised part, 10—Locking part, 10A—Column body, 10B—Toothed area, 10C—Locking tooth, 11—Butt pin, 12—Rotary part, 12A—Connecting column, 12B—Locking protrusion, 13—Connecting shaft, 14—Rotary driven part, 15A, 15B—Inserting holes.

DETAILED DESCRIPTION OF EMBODIMENTS

To make the objects, technical solutions and advantages of the embodiments of the present invention clearer, the technical solutions in embodiments of the present invention will be described clearly and completely in the following in conjunction with the accompanying drawings. It is readily apparent that the embodiments described do not limit the present invention to the described embodiments. Based on the embodiments in the present invention, other embodiments can be obtained by a person skilled in the art without creative labor, and such other embodiments fall within the scope of protection of the present invention.

According to FIGS. 1, 2, 11 and 12, a transmission device with clutch and differential functions includes a box-body part 1. The box-body part 1 includes at least two box-body sub-parts 1A, 1B assembled together and enclosed in the box-body part 1, at least one inserting hole 15A, 15B exposing or for entering the interior of the box-body part 1, and an output shaft 2. The output shaft 2 passes into the box-body part 1 through the inserting holes 15A, 15B in the box-body part 1. The output shaft 2 rotates inside the box-body part 1. The output shaft 2 extends at least partially outside the box-body part 1, while inserted in or through the closed box-body part 1. The output shaft 2 may include a single piece or at least two output shaft segments 2A, 2B. The box-body part 1 further includes a clutch unit 3 for use with the output shaft 2 or the output shaft segments 2A, 2B. The clutch unit 3 is configured to drive the output shaft 2 or the output shaft segments 2A, 2B inserted in the closed the box-body part 1 to rotate synchronously in one direction in the box-body part 1, with the output shaft 2 or the output shaft segments 2A, 2B as an axis or axes of rotation. In the closed state, the clutch unit 3 is capable of being activated so that the output shaft 2 or the output shaft segments 2A, 2B freely switch between a state of synchronous rotation in one direction and a state in which the output shaft 2 or the output shaft segments 2A, 2B freely rotate.

The clutch unit 3 is configured to drive the output shaft 2 or the output shaft segments 2A, 2B to perform a simple angular displacement within the box-body part 1, with the output shaft 2 or the output shaft segments 2A, 2B as the axis or axes of rotation in one direction or in an opposite direction of synchronous rotation in the closed the box-body part 1, and the clutch unit 3 positioned by or in contact with the output shaft 2 or the output shaft segments 2A, 2B in the box-body part 1, so that the clutch unit 3 drives the output shaft 2 or the output shaft segments 2A, 2B to switch from the state of the synchronous rotation in one direction to the state in which the output shaft 2 or the output shaft segments 2A, 2B freely rotate.

After driving the output shaft 2 or the output shaft segments 2A, 2B to perform the simple angular displacement in the direction of synchronous rotation, the clutch unit 3 can switch from the state in which the output shaft 2 or the output shaft segments 2A, 2B freely rotate to a state in which the clutch unit 3 drives or synchronously rotates the output shaft 2 or the output shaft segments 2A, 2B in one direction.

In a further embodiment, the at least one clutch unit 3 is on the output shaft 2, i.e. one clutch unit 3 controls the output shaft 2 and its synchronous or free rotation.

According to FIGS. 2, 5, 11 and 12, the clutch unit 3 includes a rotary drive part 9 for transmitting power, a rotary driven part 14 coaxially and rotationally connected to the rotary drive part 9, and a non-locking rotary limiting unit 8 for limiting the rotation of the rotary driven part 14 (e.g., without locking the rotary driven part 14). The output shaft 2 or the output shaft segments 2A, 2B pass through the rotary drive part 9, the rotary driven part 14, and the limiting unit 8 axially. The rotary drive part 9 and the rotary driven part 14 are disposed on or around the output shaft 2 or the output shaft segments 2A, 2B to allow their rotation. The rotary driven part 14 is connected to at least one connecting shaft 13 parallel to the output shaft 2 or the output shaft segments 2A, 2B. The connecting shaft 13 is rotationally connected to a locking part 10 through a corresponding arc segment hole 9A in the rotary drive part 9, so that the rotary drive part 9 can drive the locking part 10 to perform a simple angular displacement. After the locking part 10 performs the simple angular displacement, the locking part 10 engages with a rotary part 12 connected to the output shaft 2 or the output shaft segments 2A, 2B so that the output shaft 2 or the output shaft segments 2A, 2B rotate synchronously with the rotary drive part 9. The output shaft 2 or the output shaft segments 2A, 2B perform a simple angular displacement in a direction opposite to the synchronous rotation of or by the rotary drive part 9 so that the rotary part 12 disengages from the locking part 10. As a result, the output shaft 2 or the output shaft segments 2A, 2B rotate freely. The box-body part 1 may limit the limiting unit 8 to rotate with the output shaft 2 or the output shaft segments 2A, 2B (e.g., as the axes of rotation).

The rotation of the rotary driven part 14 may be limited (e.g., in a non-locking manner) by the limiting unit 8. When the rotary drive part 9 is rotated, the rotary driven part 14 may remain stationary due when the limiting unit 8 imparts a force on the rotary driven part 14. Then, the rotary drive part 9 drives the locking part 10 to perform the simple angular displacement so that the locking part 10 engages with the rotary part 12. Therefore, the rotary drive part 9, the rotary driven part 14 and the output shaft 2 or the output shaft segments 2A, 2B rotate synchronously in one direction. Therefore, the limiting unit 8 may control whether or not the locking part 10 engages in or disengages from the rotary part 12.

To be able to limit the rotation of the rotary driven part 14 in a non-locking manner, and smoothly control engagement and disengagement of the locking stop part 10 with the connecting shaft 13, the limiting unit 8 preferably comprises a two-jawed clip or a multi-jawed clip, which may have a certain degree of elasticity. The clip with a multi-jawed structure is configured to limit the rotation of the non-locking rotary driven part 14 under an elastic force. The elastic clamping force of the clip may be relatively small, and clamps the rotary driven part 14 while the rotary driven 14 is still rotatable (i.e., the wear between the clip and the rotary driven part 14 may be reduced).

Figure 6:
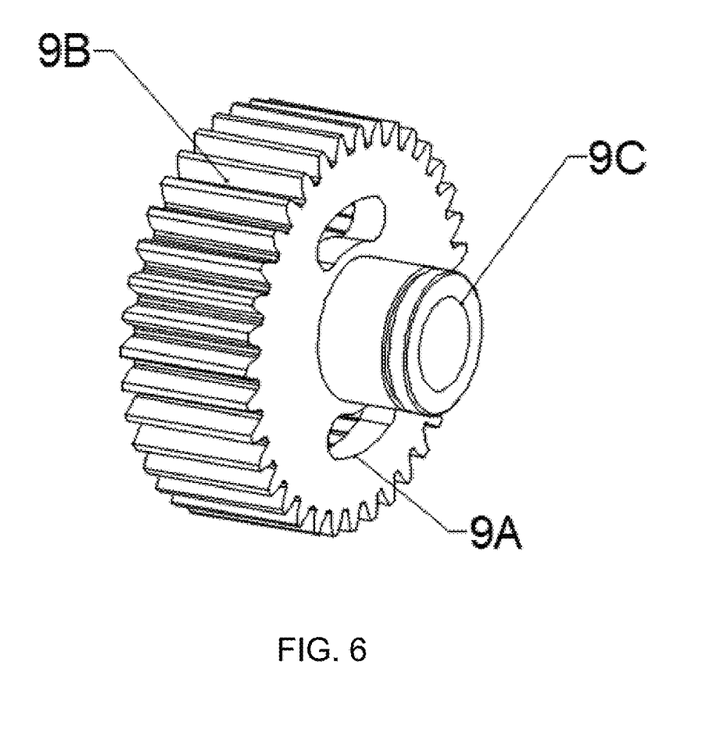
FIG. 6 is an axonometric view of an exemplary rotary drive part in accordance with the present invention.
Figure 9:
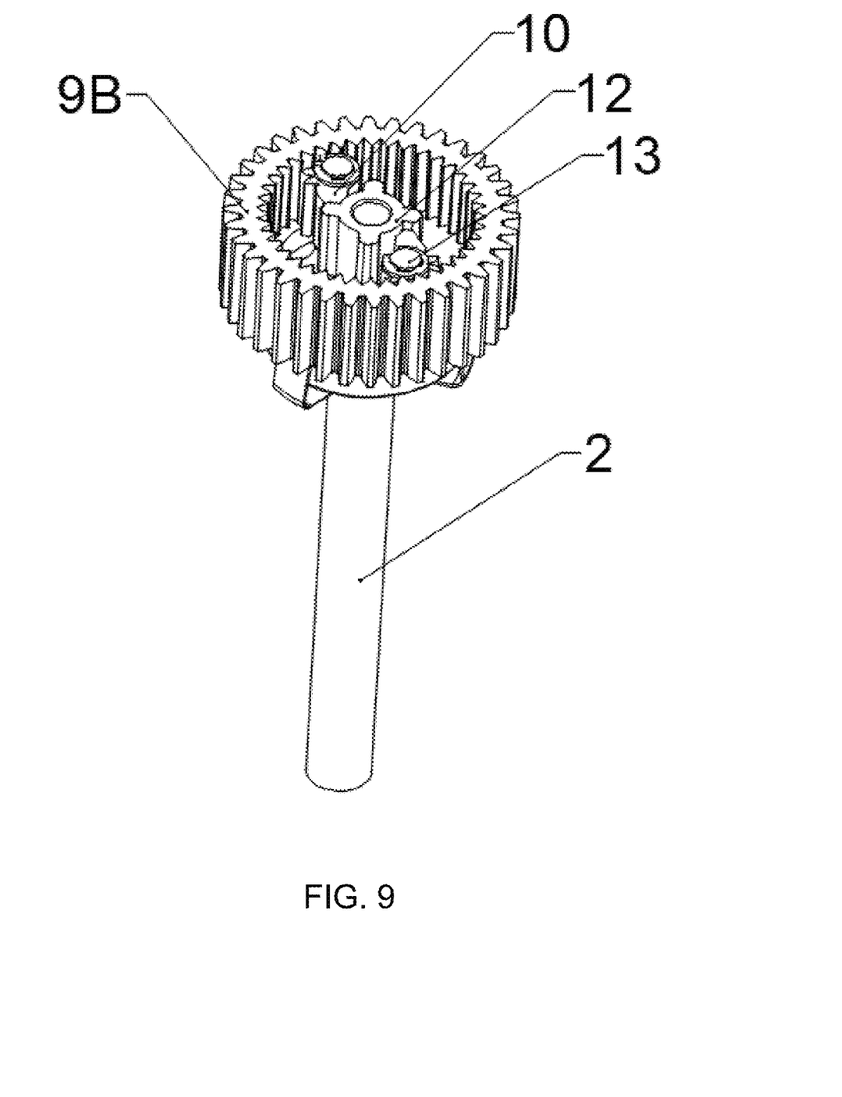
FIG. 9 is an axonometric view of an exemplary assembly of a clutch unit and an output shaft in accordance with the present invention.
Figure 10:
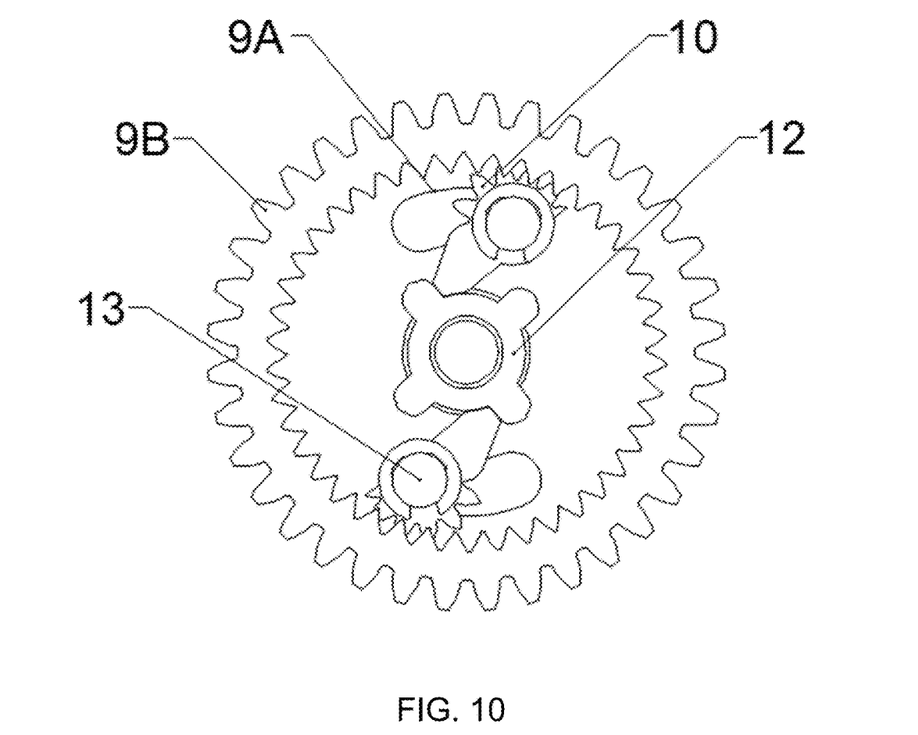
FIG. 10 is a top view of an exemplary clutch unit and an exemplary output shaft in accordance with the present invention.
Figure 11:
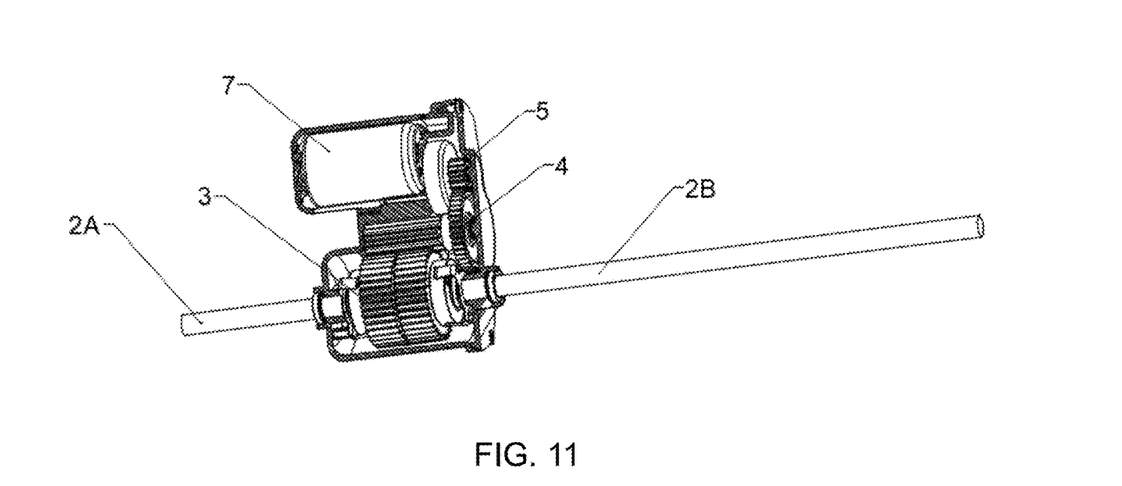
FIG. 11 is an axial side view of an embodiment of the present invention.

According to FIGS. 6, 9 and 10, the rotary drive part 9 includes a toothed ring 9B with a closed end and both internal and external teeth, and a raised part 9C. The raised part 9C is coaxially connected to the closed end of the toothed ring 9B. The arc segment hole 9A is in the closed end of the toothed ring 9B. The rotary driven part 14 is rotationally and coaxially disposed on the raised part 9C. The toothed ring 9B is configured to accommodate the rotary part 12 and the locking part 10. The inner teeth of the toothed ring 9B are configured to drive the locking part 10 to perform the simple angular displacement so that the locking part 10 disengages from or engages with the rotary part 12. The outer teeth of the toothed ring 9B are configured to receive power (e.g., externally transmitted, for example from the toothed column 4A).

Figure 7:
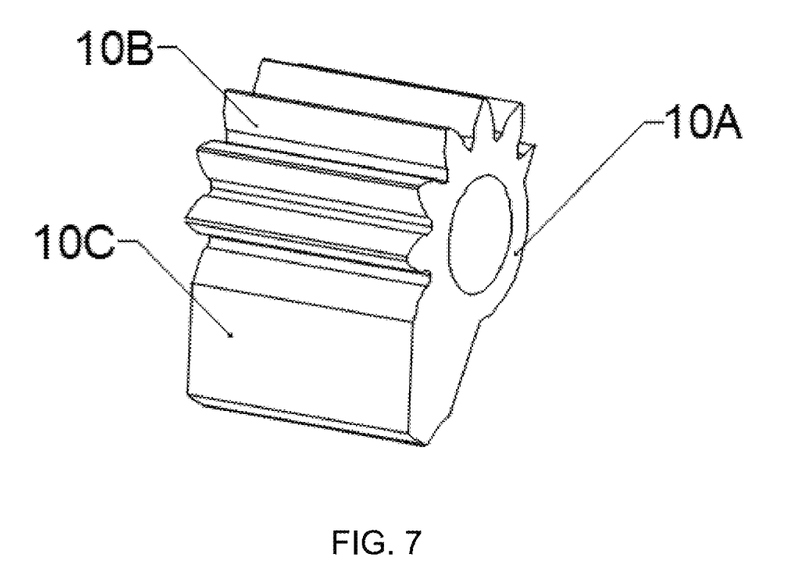
FIG. 7 is an axonometric view of an exemplary locking part in accordance with the present invention.

According to FIGS. 7, 9 and 10, the locking part 10 includes a column body 10A rotationally connected to 9 e.g., in rotational contact with) the connecting shaft 13. A toothed area 10B may mesh with the internal teeth of the toothed ring 9B, and the locking tooth 10C, which engages with or disengages from the rotary part 12, in on the column body 10A. The toothed ring 9B drives the locking part 10 to perform simple angular displacement during rotation, so that the locking tooth 10C engages with or disengages from the rotary part 12. Therefore, the clutch unit 3 and the output shaft 2 or the output shaft segments 2A, 2B rotate synchronously in one direction.

Figure 8:
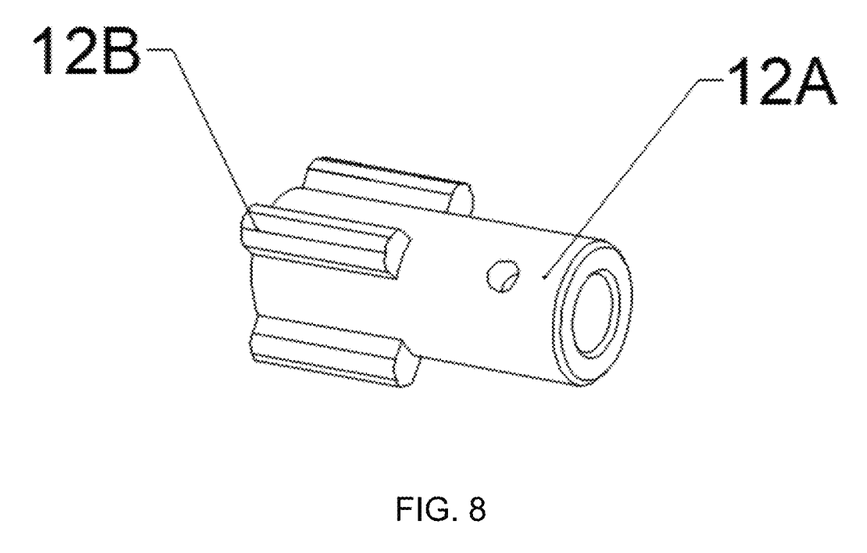
FIG. 8 is an axonometric view of an exemplary rotary part in accordance with the present invention.

According to FIGS. 8, 9 and 10, the rotary part 10 may engage with a connecting column 12A connected to the output shaft 2 or the output shaft segments 2A, 2B and having a locking protrusion 12B. The at least one locking protrusion 12B is on (e.g., extending from) a circumference of the connecting column 12. The locking tooth 10C may contact with the locking protrusion 12B to limit movement of the connecting column 12A, so that the output shaft 2 or the output shaft segments 2A, 2B can rotate synchronously with the rotary drive part 9.

Figure 5:
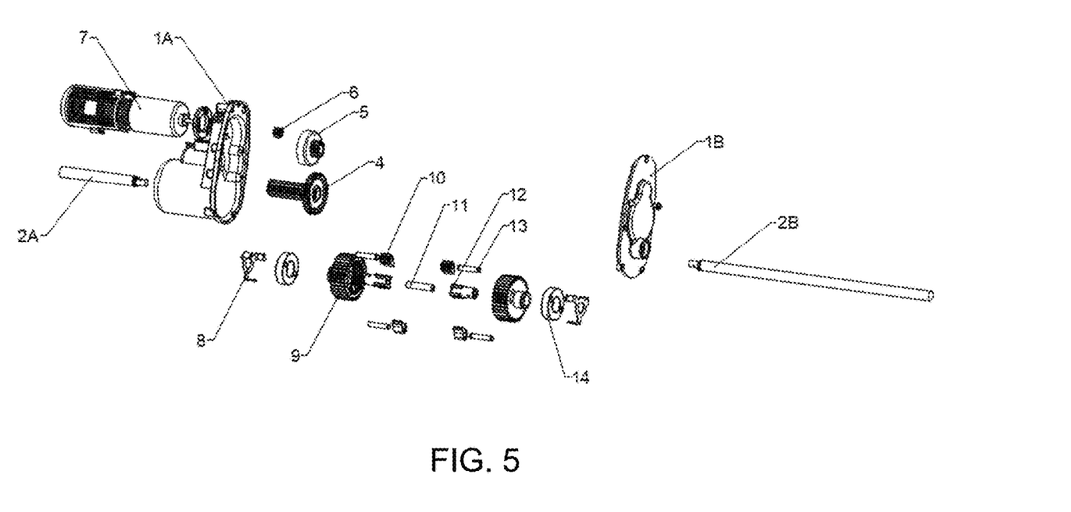
FIG. 5 is an exploded view of an embodiment of the present invention.
Figure 12:
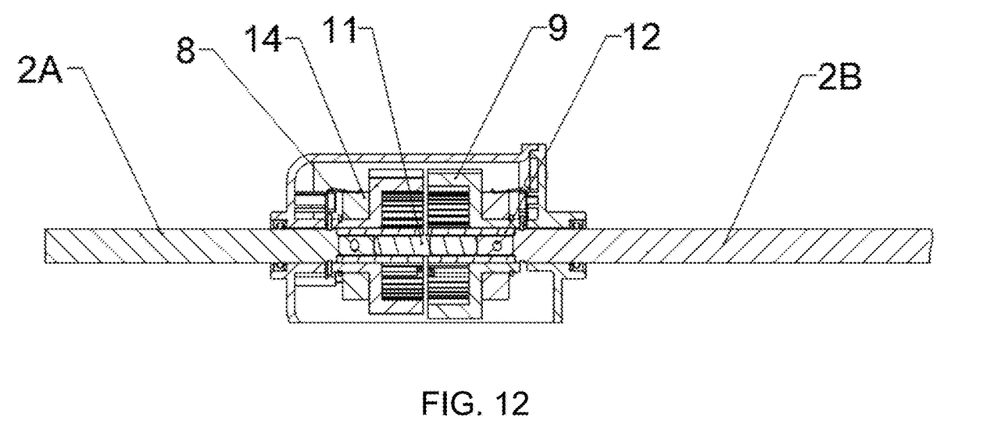
FIG. 12 is a sectional view of an exemplary clutch unit in accordance with the present invention.

As shown in FIGS. 5 and 12, the rotary part(s) 12 on the output shaft segments 2A, 2B may be rotationally connected to each other with a butt pin 11. The output shaft segments 2A, 2B are in the same straight line, so that the roller(s) (e.g., a wheel on the outer end of each output shaft segment) can move forward synchronously when the self-propelled machine starts. The roller(s) are free to move forward and backward during shutdown. The self-propelled machine may realize a differential turn (e.g., different rotation rates or angles for the different output shaft segments) during startup.

Figure 1:
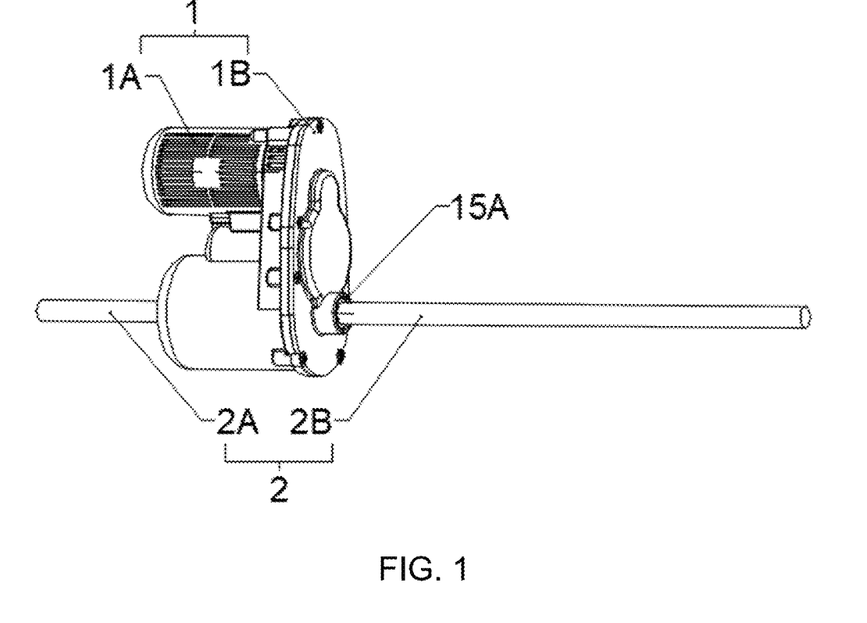
FIG. 1 is an axial side view of an embodiment of the present invention.
Figure 2:
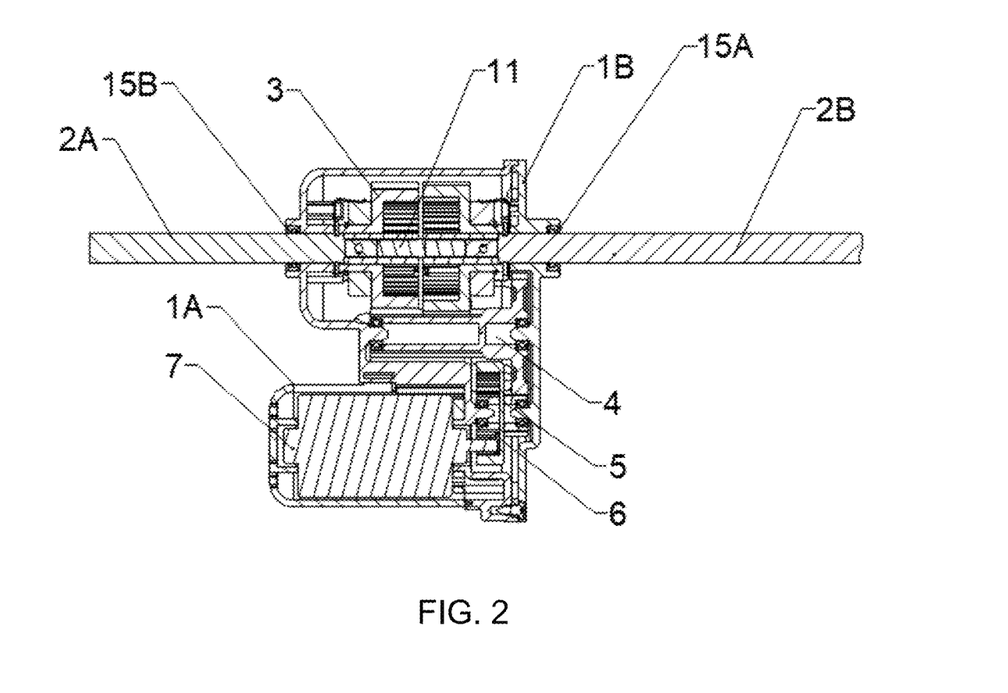
FIG. 2 is a sectional view of an embodiment of the present invention.

As shown in FIG. 2, the box-body part 1 further includes a motor 7 in and supported by the box-body part 1 and a transmission unit in the box-body part 1. An output terminal of the motor 7 is connected to the clutch unit 3 via a transmission mechanism to provide power to the clutch unit 3 on the output shaft 2 or the output shaft segments 2A, 2B. The drive mechanism acts as transmission.

As shown in FIGS. 2, 3, 4, 11 and 12, the transmission unit includes an active rotary gear 6 connected to the output terminal of the motor 7, a driven transmission part II 5, and at least one driven transmission part I 4. The driven transmission part I 4 and the driven transmission part II 5 are rotationally disposed (e.g., may rotate) in the box-body part 1. The driven transmission part I 4 meshes with the driven transmission part II 5 to provide power. The active rotary gear 6 meshes with the driven transmission part II 5 to provide power. The driven transmission part I 4 meshes with the clutch unit 3 on the output shaft 2 or on the output shaft segments 2A, 2B to rotate the gear (e.g., the outer teeth of the toothed ring 9B, so that the clutch unit 3 may be provided with power to automatically drive).

Figure 3:
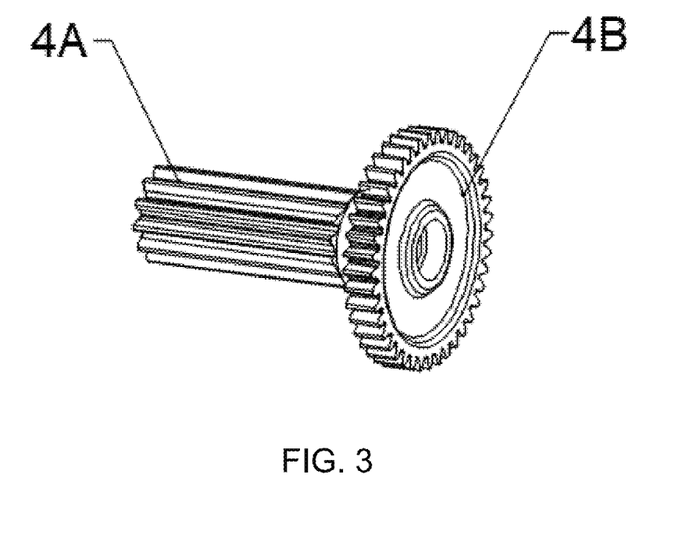
FIG. 3 is an axial perspective view of an exemplary driven transmission part I of the present invention.
Figure 4:
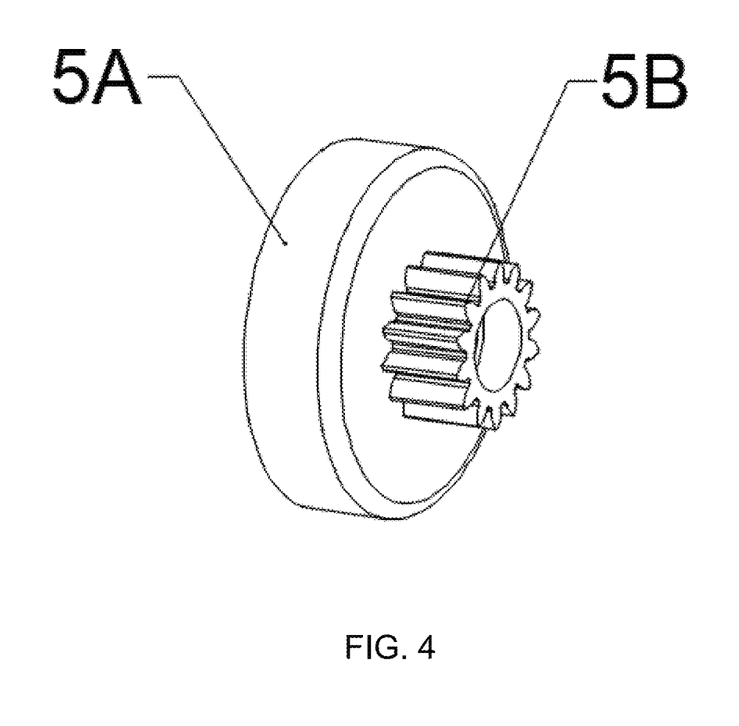
FIG. 4 is an axial perspective view of an exemplary driven transmission part II of the present invention.

In a further embodiment, the driven transmission part II 5 includes an inner gear ring 5A with a closed structure at one end and a connecting gear II 5B coaxially connected to the inner gear ring 5A. The driven transmission part I 4 includes a toothed column 4A and a connecting gear I 4B coaxially connected to the toothed column 4A. Inner teeth of the inner gear ring 5A mesh with the active rotary gear 6. The connecting gear II 5B meshes with the connecting gear I 4B. The toothed column 4A meshes with the clutch unit (e.g., to transmit power to a gear, for example in the rotary drive part 9). With this design, a plurality of gears are coupled to provide power to the clutch unit 3.

Working Principle:

During operation, a starter motor 7 drives (e.g., rotates) the toothed ring 9B through the transmission mechanism. The rotary driven part 14 is stationary under the limitation of (e.g., due to engagement with) the limiting unit 8. Because the toothed area 10B meshes with the inner teeth of the toothed ring 9B, the toothed ring 9B rotates while driving the column 10A to rotate by simple angular displacement, so that the locking tooth 10C contacts or engages the locking protrusion 12B on the connecting column 12A.

The locking tooth 10C pushes the locking protrusion 12B so that the output shaft 2 or the output shaft segments 2A, 2B rotate synchronously with the toothed ring 9B in one direction, thereby being in a driving state (e.g., for automatically driving a lawn mower forward).

During non-operation, the motor 7 is stopped or off, and the toothed ring 9B is not subject to an external force. The output shaft 2 or the output shaft segments 2A, 2B rotate synchronously with the toothed ring 9B in one direction by a simple angular displacement (e.g., in the opposite direction). The connecting column 12A rotates so that the locking protrusion 12B pushes the locking tooth 10C away from the locking protrusion 12B and the locking tooth 10C disengages from the locking protrusion 12B. Thereafter, the rotary part 12 and the output shaft 2 or the output shaft segments 2A and 2B can rotate freely. Then, the lawn mower can be manually pushed for free forward and backward movement.

During differential operation, when the output shaft segments 2A, 2B and the toothed ring 9B rotate synchronously in one direction, and when the mower is manually pushed to turn (e.g., change forward or backward direction), the rotational speeds of the output shaft segments 2A, 2B are different. While turning, the outer output shaft segment has a rotational speed greater than that of the inner output shaft segment. Thus, the outer output shaft segment also has a rotational speed greater than that of the toothed ring 9B. The locking protrusion 12B pushes the locking tooth 10C to disengage from the locking protrusion 12B, so that the locking tooth and the locking protrusion are disengaged. At this time, the inner and outer output shaft segments can have different rotational speeds when turning, thereby realizing a differential function.

The foregoing is of preferred and/or specific embodiment(s) of the present invention, but the scope of protection of the present invention is not limited thereto. Equivalent substitutions or changes made by person skilled in the art within the scope of the technology disclosed herein in accordance with the technical solution(s) of the present invention and its inventive concept(s) shall fall within the scope of protection of the present invention.

What is claimed is:

1. A transmission device with clutch and differential functions, comprising a box-body part, wherein the box-body part comprises at least two box-body sub-parts, at least one inserting hole exposing an interior of the box-body part, and an output shaft, the output shaft is partially in the box-body part and through the at least one inserting hole, the output shaft is configured to rotate in the box-body part, the output shaft extends at least partially outside the box-body part, the output shaft includes a single piece or at least two output shaft segments, the box-body part further comprises a clutch configured to drive the output shaft or the output shaft segments to rotate synchronously in one direction in the box-body part with the output shaft or the output shaft segments as axes, the clutch is capable of being activated so that the output shaft or the output shaft segments freely switch between a state of synchronous rotation in the one direction and a state in which the output shaft or the output shaft segments freely rotate;

the clutch is configured to drive the output shaft or the output shaft segments to perform a simple angular displacement within the box-body part, with the clutch positioned by the output shaft or the output shaft segments in the box-body part, so that the clutch switches from the state of the synchronous rotation in the one direction to the state in which the output shaft or the output shaft segments freely rotate;

the clutch comprises a rotary drive part for transmitting power, a rotary driven part coaxially and rotationally connected to the rotary drive part, and a non-locking rotary limiting unit configured to limit rotation of the rotary driven part;

the output shaft or the output shaft segments pass through the rotary drive part, the rotary driven part, and the limiting unit axially;

the rotary drive part and the rotary driven part are rotationally disposed on the output shaft or the output shaft segments, the rotary driven part is connected to at least one connecting shaft parallel to the output shaft or the output shaft segments, the connecting shaft is rotationally connected to a locking part through a corresponding arc segment hole in the rotary drive part so that the rotary drive part drives the locking part to perform a simple angular displacement;

the locking part is configured to engage with a rotary part connected to the output shaft or the output shaft segments so that the output shaft or the output shaft segments rotate synchronously with the rotary drive part;

when the output shaft or the output shaft segments are angularly displaced in a direction opposite from the synchronous rotation, that the rotary part disengages from the locking part and the output shaft or the output shaft segments rotate freely, wherein the box-body part limits rotation of the limiting unit;

the rotary drive part comprises a toothed ring with a closed end and internal and external teeth, and a raised part, the raised part is coaxially connected to the closed end of the toothed ring, the arc segment hole is in the closed end of the toothed ring, the rotary driven part is coaxial with the raised part, the toothed ring is configured to accommodate the rotary part and the locking part, the internal teeth of the toothed ring are configured to drive the locking part to perform the simple angular displacement so that the locking part disengages from or engages with the rotary part;

the locking part comprises a column body rotationally connected to the connecting shaft, a toothed area configured to mesh with the internal teeth of the toothed ring and a locking tooth configured to engage with or disengage from the rotary part on the column body, and the toothed ring drives the locking part to perform the simple angular displacement during rotation, so that the locking tooth engages with or disengages from the rotary part; and the rotary part comprises a connecting column connected to the output shaft or the output shaft segments and at least one locking protrusion, the at least one locking protrusion is on the connecting column, and the locking protrusion is in contact with the locking tooth to limit the connecting column so that the output shaft or the output shaft segments rotate synchronously with the rotary drive part.

2. The transmission device according to claim 1, comprising the output shaft.

3. The transmission device according to claim 2, wherein the clutch is on or in contact with the output shaft.

4. The transmission device according to claim 1, wherein the limiting unit comprises a two-jawed clip or a multi-jawed clip.

5. The transmission device according to claim 1, comprising the output shaft segments.

6. The transmission device according to claim 5, further comprising a butting pin rotationally connecting the rotary parts on the output shaft segments.

7. The transmission device according to claim 5, wherein the output shaft segments are in a same straight line.

8. The transmission device according to claim 1, wherein the box-body part further comprises a motor in and supported by the box-body part and a transmission unit in the box-body part.

9. The transmission device according to claim 8, wherein the motor has an output terminal connected to the clutch via the transmission unit to provide power to the clutch.

10. The transmission device according to claim 9, wherein the transmission unit comprises an active rotary gear connected to the output terminal of the motor.

11. The transmission device according to claim 10, wherein the transmission unit further comprises a first driven transmission part, and at least one second driven transmission part, wherein the at least one second driven transmission part meshes with the first driven transmission part.

12. The transmission device according to claim 11, wherein the active rotary gear meshes with the first driven transmission part, and the at least one second driven transmission part meshes with the clutch.

13. The transmission device according to claim 11, wherein the first driven transmission part includes an inner gear ring with a closed structure at one end and a first connecting gear coaxially connected to the inner gear ring.

14. The transmission device according to claim 13, wherein teeth of the inner gear ring mesh with the active rotary gear, and the first connecting gear meshes with a second connecting gear.

15. The transmission device according to claim 11, wherein the at least one second driven transmission part includes a toothed column and a second connecting gear coaxially connected to the toothed column.

16. The transmission device according to claim 15, wherein the toothed column meshes with the clutch.

* * * * *